United States Patent [19]

Sakamoto et al.

[11] Patent Number: 5,115,886

[45] Date of Patent: May 26, 1992

[54] MOVABLE PLATFORM FOR CONSTRUCTION SITES

[75] Inventors: Kazunari Sakamoto, Tokyo; Isao Nemoto, Narashino, both of Japan

[73] Assignees: Iseki Kaihatsu Koki Co., Ltd., Tokyo; Nemoto Kikaku Kogyo Co., Ltd., Chiba, both of Japan

[21] Appl. No.: 696,986

[22] Filed: May 2, 1991

Related U.S. Application Data

[63] Continuation of Ser. No. 375,861, Jul. 5, 1989, abandoned.

[30] Foreign Application Priority Data

Jul. 8, 1988 [JP] Japan .................. 63-170116
Nov. 28, 1988 [JP] Japan .................. 63-299937

[51] Int. Cl.⁵ .............................................. E04G 3/16
[52] U.S. Cl. ...................................... 182/36; 74/425; 182/150
[58] Field of Search ............. 414/10, 11, 744.1, 744.2, 414/744.3, 744.6; 901/1, 17; 74/425, 458; 182/36, 37, 39, 150, 142, 143, 144, 147, 131

[56] References Cited

U.S. PATENT DOCUMENTS

| | | | |
|---|---|---|---|
| 2,930,441 | 3/1960 | Lacy et al. | 182/37 X |
| 3,076,522 | 2/1963 | Goodell | 182/36 X |
| 3,438,514 | 4/1969 | Bose et al. | 414/11 |
| 3,550,723 | 12/1970 | Gentry | 182/150 X |
| 3,602,335 | 8/1971 | Gustetic | 182/150 X |
| 3,834,555 | 9/1974 | Benington et al. | 414/744.6 X |
| 4,271,927 | 6/1981 | Brown et al. | 182/36 |
| 4,276,959 | 7/1981 | Barber | 182/150 |
| 4,296,905 | 10/1981 | Powell | 182/150 X |
| 4,400,133 | 8/1983 | Booker | 414/10 X |
| 4,496,027 | 1/1985 | Fisher | 182/150 X |
| 4,648,286 | 3/1987 | Nemoto | 74/425 |
| 4,650,392 | 3/1987 | Casteal | 414/10 X |
| 4,651,586 | 3/1987 | Nemoto | 74/425 |
| 4,656,884 | 4/1987 | Nemoto | 74/458 |
| 4,660,678 | 4/1987 | Krag | 182/37 X |
| 4,682,926 | 7/1987 | Chambers et al. | 414/11 |
| 4,848,516 | 7/1989 | Nakai et al. | 182/150 X |

FOREIGN PATENT DOCUMENTS

| | | | |
|---|---|---|---|
| 3152189 | 10/1983 | Fed. Rep. of Germany | 414/10 |
| 3444806 | 6/1986 | Fed. Rep. of Germany | 182/150 |
| 3701485 | 7/1988 | Fed. Rep. of Germany | 414/10 |
| 1113360 | 3/1956 | France | 414/744.2 |
| 58-152958 | 9/1983 | Japan . | |
| 58-211052 | 12/1983 | Japan . | |
| 59-19769 | 2/1984 | Japan . | |
| 59-93551 | 5/1984 | Japan . | |
| 60-192157 | 9/1985 | Japan . | |
| 60-201158 | 10/1985 | Japan . | |
| WO86/02121 | 4/1986 | PCT Int'l Appl. . | |
| 45382 | 2/1962 | Poland | 414/10 |
| 0603577 | 4/1978 | U.S.S.R. | 414/744.6 |
| 1526854 | 10/1978 | United Kingdom . | |
| 2186537 | 8/1987 | United Kingdom . | |

Primary Examiner—David A. Bucci
Assistant Examiner—William M. Hienz
Attorney, Agent, or Firm—Frishauf, Holtz, Goodman & Woodward

[57] ABSTRACT

The present invention relates to a movable conveyor for construction sites. The platform includes: (a) a stage having two opposite end portions for conveying objects thereon; (b) a pair of elongated arms attached to the respective end portion of the stage, slidable and rotatable with respective to the stage in a horizontal plane; (c) a plurality of holders installed in the arms, the holders being adapted to grasp the structure and to hang therefrom; (d) a driving mechanisms to slide and rotate the elongated arms with respect to the stage and the holders; and (e) controller for sliding and rotating the driving mechanisms and for holders and releasing the holding, whereby the stage is conveyed with respect to the structure.

3 Claims, 7 Drawing Sheets

MOVABLE PLATFORM FOR CONSTRUCTION SITES

This application is a continuation of application Ser. No. 07/372,861, filed July 5, 1989, now abandoned.

BACKGROUND OF THE INVENTION

The present invention relates to a movable platform which is preferably used in construction sites, such as of buildings or bridges.

Conventionally, it is difficult for constructing personnel to observe conditions at elevational sites of, for example, buildings or bridges during and/or after construction. Therefore, an apparatus which has an extendable arm and a camera affixed to the forward end of the arm was developed. The position of the camera is remote-controlled so that conditions may be observed without moving the observer to the site.

However, if this apparatus is used, the field of the camera is limited, and it is difficult to position the camera in a desired location. Therefore, accuracy of observation cannot be improved. Furthermore, if the site to be observed is distant, the expandable arm must be long, requiring that the platform be large-scale and therefore costly.

SUMMARY OF THE INVENTION

It is therefore an object of the present invention to provide a movable platform for construction sites, such as building construction sites or bridge. According to the present invention, the platform can be safely conveyed by observation personnel. The self-movable platform of the present invention comprises: (a) a stage having two opposite end portions for conveying objects thereon; (b) a pair of elongated arms attached to the respective end portions of the stage, slidable and rotatable with respective to the stage in a horizontal plane; (c) a plurality of holding means installed in the arms, the holding means being adapted to hold hanging means of the structure, to hang therefrom; (d) driving means to slide and rotate the elongated arms with respect to the stage and the hanging means; and (e) a control means for sliding and rotating the driving means and for holding and releasing the holding means, whereby the stage being conveyed with respect to the structure.

DETAILED DESCRIPTION OF THE PREFERRED EMBODIMENT

With reference to the accompanying drawings, a preferred embodiment of the present invention will be described hereinafter.

Figure 1:
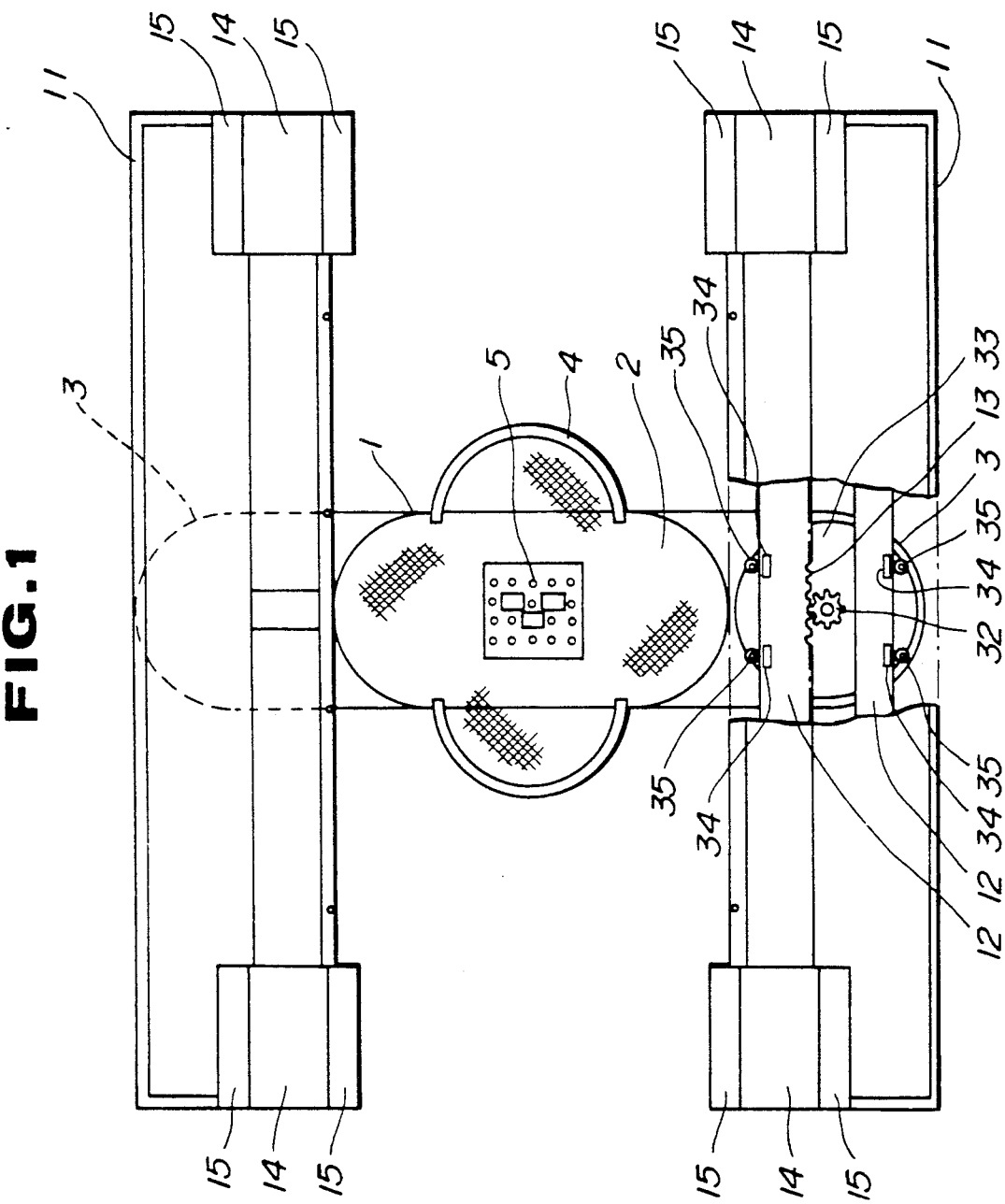
FIG. 1 is a plan view showing a movable platform according to an embodiment of the present invention.
Figure 2:
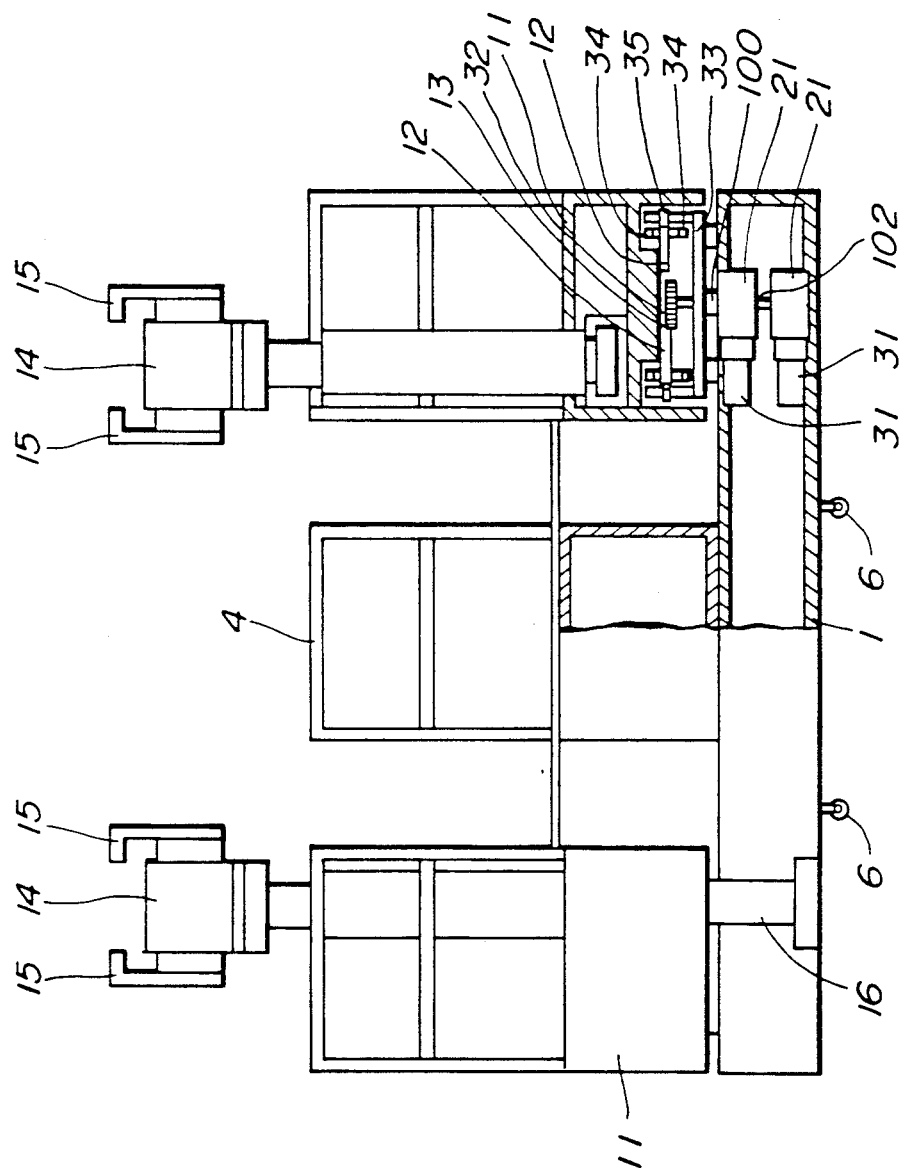
FIG. 2 is a side view showing the platform.
Figure 3:
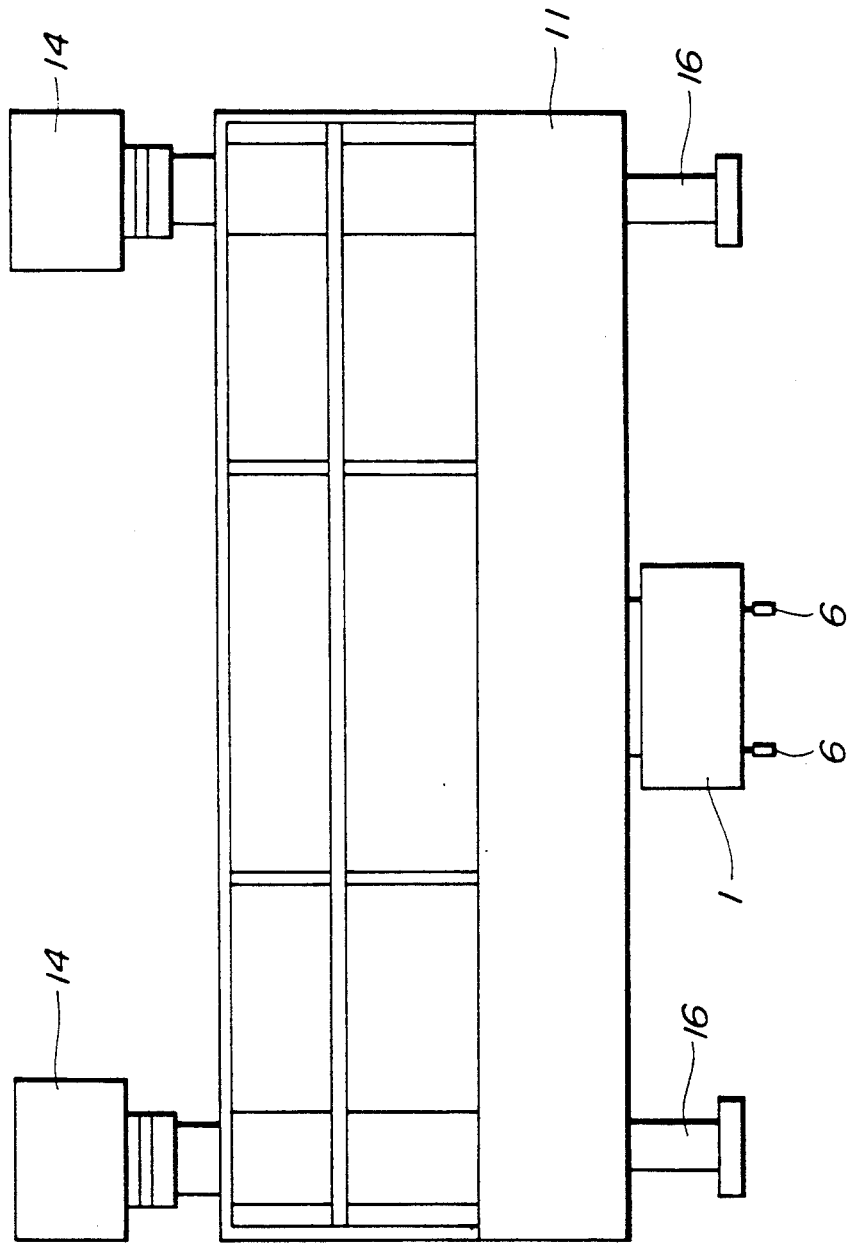
FIG. 3 is a front view showing the platform.
Figure 4:
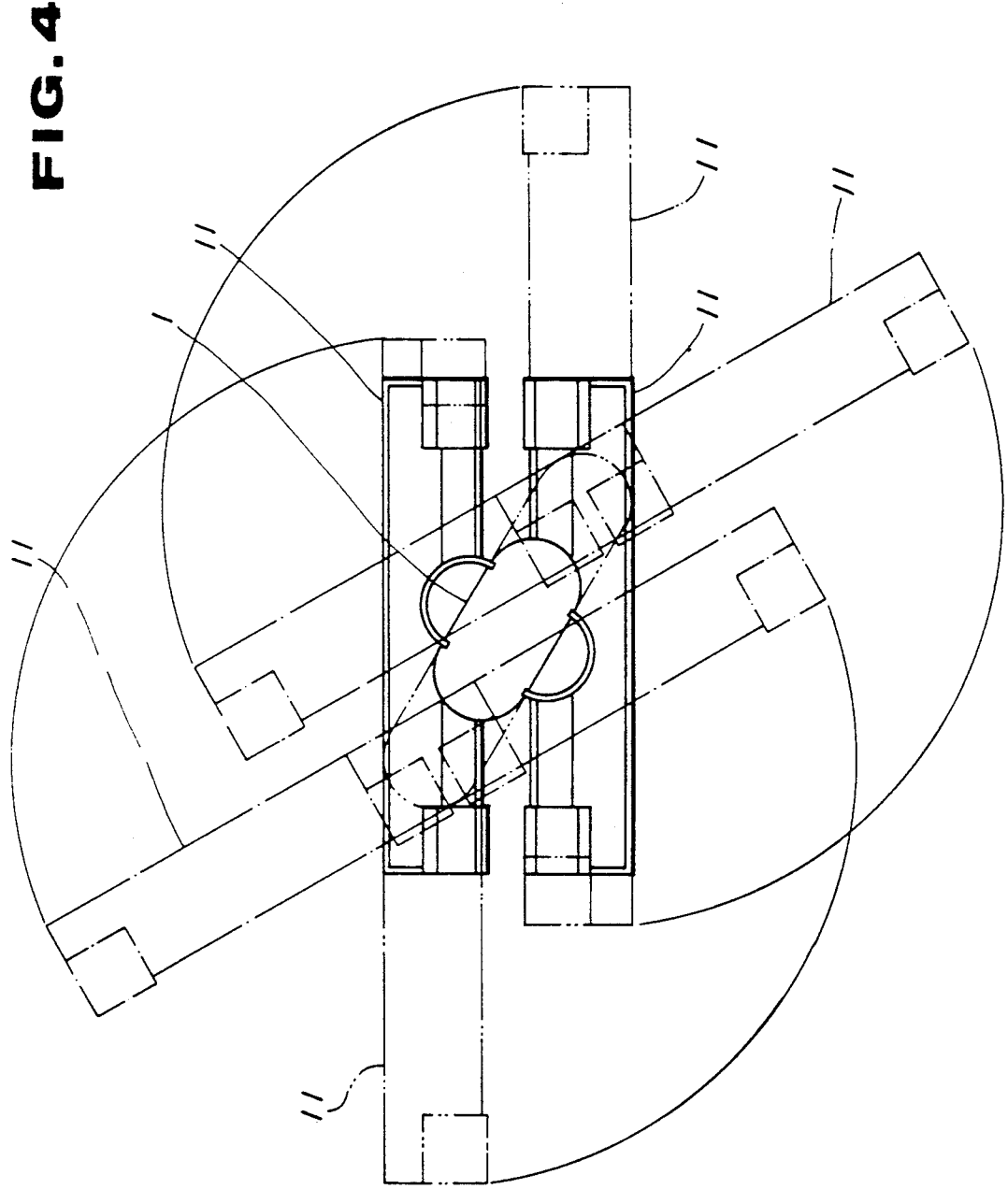
FIG. 4 is a plan view showing the movable platform when the platform is compacted.

FIGS. 1, 2, and 3 depict a movable platform which has a pair of elongated arms 11 formed in a generally rectangular solid, and an elongated connection stage 3 connecting the bottoms of the arms 11. A personnel stage 2 of a generally elliptical shape for observation personnel with a pair of handrails is mounted on the middle of the connection stage 3. On the personnel stage 32, a control panel 5 is installed for controlling the stage platform according to commands from an operator.

Two motors 31 are installed inward of the connection stage 3 below one of the arms 11. One of the motors 31 is connected via a transmission 21 and a shaft 102 to a pinion 32 of vertical axis. Another one of the motors 31 is connected via another transmission 21, the same type of unit as the one mentioned just above, to a shaft 100 and a plate 33 of circular cross section and vertical axis. The shaft 100, with a larger diameter than shaft 102, has a hole through which the shaft 102 passes concentrically. Therefore, while the shafts 100 and 102 are disposed concentrically to each other, they are respectively connected to the circular plate 33 and the pinion 13 without making contact. The transmissions 21 preferably have a structure as will be described later.

Each of the arms 11 has a pair of elongated rails 12 disposed parallel to each other in a horizontal plane, to form the skeleton of the arm 11. A rack 13 held in engagement with the pinion 32 is formed at an entire side of one of rails 12. Therefore, as one of the motors 31 rotates, the arm 11 moves horizontally along the longitudinal axis of the arm 11.

Above the circular plate 33, four guide rollers 35, the shafts of which stand perpendicularly on the circular plate 33, are installed so that the guide rollers always contact the rails 12. As best shown in FIG. 1, two guide rollers 35 which contact one of the rails 12, and two other guide rollers 35 which contact another rail 12, are spaced apart at a distance between the outer sides of the rails 12. Four pairs of guide rollers 34 with axes parallel to the circular plate 33 are provided to the circular plate 33 in such a manner that each pair of guide rollers 34 sandwich the rail 12. Therefore, as another motor 31 rotates, the circular plate 33 rotates with the guide rollers 35 to pivot the arm 11. When the arm 11 is pivoting, the arm 11 does not incline since the guide rollers 35 restrict vertical movement of the arm 11.

Above the arms 11, a pair of holders 14 similar to a vise each of which has a pair of jaws 15, is installed at both ends of each of the arms 11. When each of the holders 14 receives a signal from the control panel 55, the jaws 15 are moved to approach to, or be spaced apart from each other by a driving force such as an electric force, oil pressure, or pneumatic force. The holders 14 preferably have an oil pressure cylinder for vertical extension and retraction.

Legs 16, extending downward from the arms 11, are installed in the arms 11. The legs 16 can be extended and retracted by, for example, oil pressure cylinders. At the bottom of the connecting stage 11, rollers 6 are installed so that the movable platform can travel to all directions on the ground.

Figure 6:
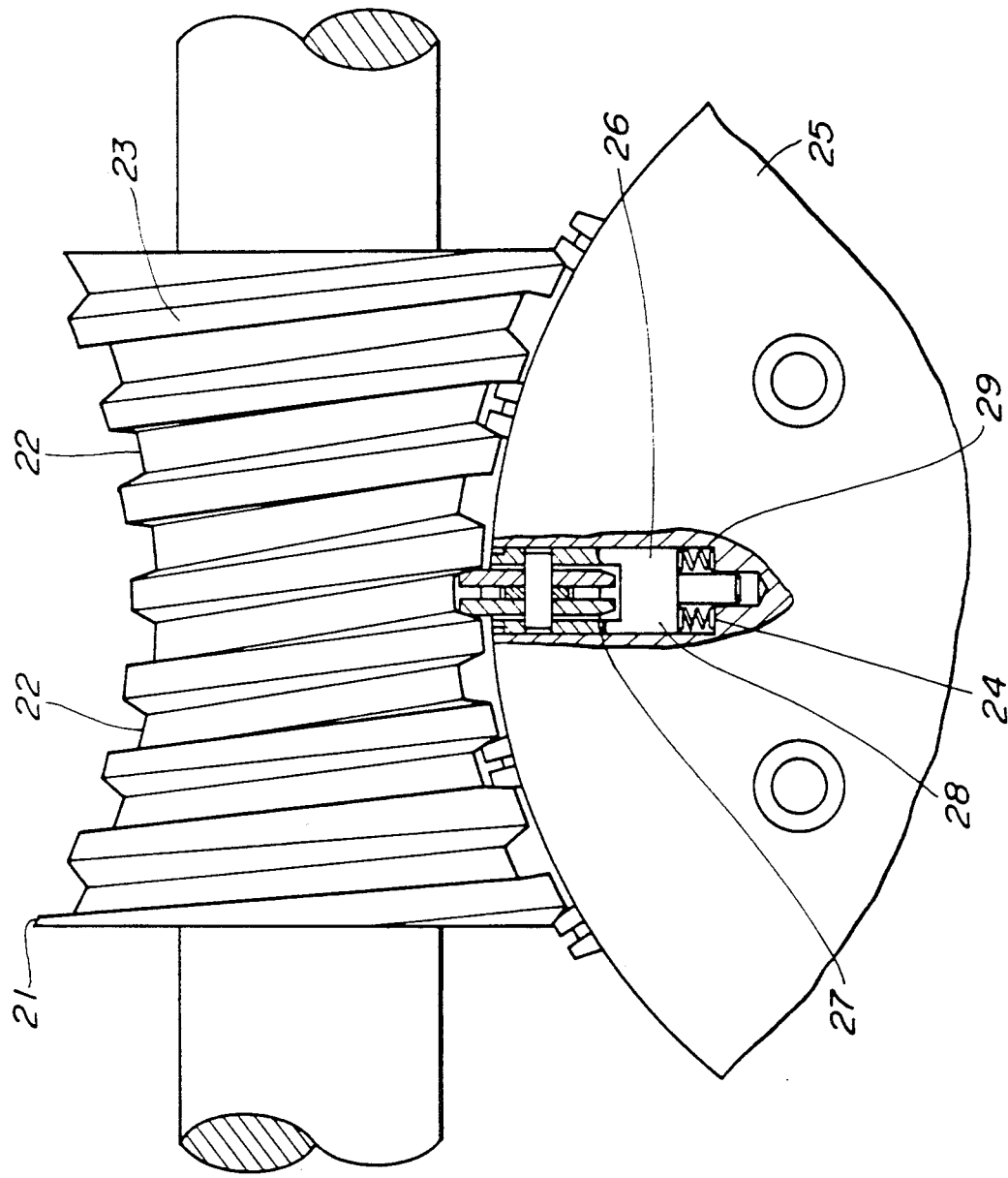
FIG. 6 is a front view showing a speed-reduction unit used in the platform.
Figure 7:
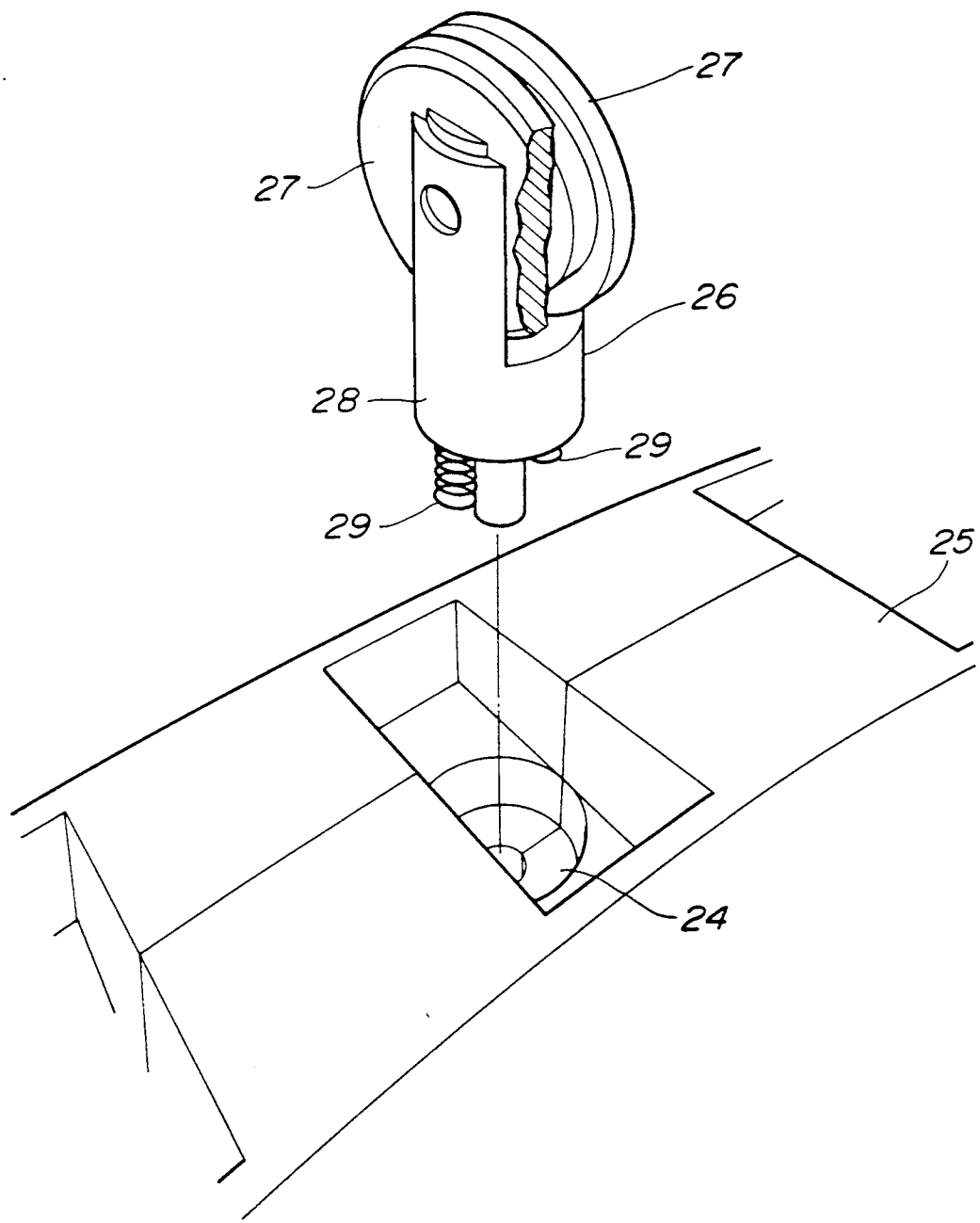
FIG. 7 is a perspective view showing the speed-reduction platform.

The above-mentioned transmission 21 is a speed-reduction unit, as shown in FIGS. 6 and 7. The speed-reduction unit 21 consists of a Hindley worm 23 having a helical groove 22 and a wheel 25 which engages the worm 23, and which has an axis perpendicular to that of the worm 23. The shaft of the Hindley worm 23 is connected with one of the shafts of the motors 31 of FIG. 2. The shaft (not shown) of the wheel 25 is connected with one of the shafts 100 and 102. The wheel 25 includes a circular plate and a plurality of recesses 24 of rectangular cross section on the outer peripheral surface of the circular plate with the recesses 24 being evenly disposed and spaced angularly apart from each other at a pitch equaling an integer multiple of the groove 22 of the worm 23. The recess 24 has a hollow extending inward from the bottom thereof, and an aperture of a smaller cross section that the hollow extending inward from the bottom of the hollow. At the recesses 24, a plurality of roller unit 26 are respectively equipped, each of which has a roller support 28 provided in the hollow of the recess 24, and a pair of concentric rollers 27 of a circular cross section rotatably supported by the roller-support 28 in such a manner that the common axis of the rollers 27 is generally perpendicular to the axis of the wheel 25. The roller-support 28 further has a rod portion extending concentrically from the bottom of the roller-support 28 to be inserted into the aperture of the recess 24. A pair of springs 29 are interposed between the bottom of the roller support 28 and the bottom of the hollow of the recess 24 to push the roller support 28 outwardly. As described above, the pairs of the rollers 27 which project outward radially from the outer peripheral surface of the circular plate, are able to be radially extended and retracted, and is always pushed to the worm 23 by the springs 29. Furthermore, the rollers 27 can rotate along the groove 22 of the worm 22 with little friction between the groove 22 and the rollers 27. Therefore, as the worm 23 rotates, the wheel 25 can rotate without any backlash between the groove 22 and the rollers 27, so that the wheel 25 can rotate very smoothly. Furthermore, between the above-mentioned elements, there are suitable clearances, so that the rollers 27 can be inclined slightly in response to the warp of the face of the groove 22.

In order to operate the above construction, the observation personnel first climbs on the personnel stage 2 and, by using the control panel 5, drives the motors 31 to alternately move the arms 11 straight and/or rotationally in a horizontal plane. The holders 14 are controlled to be shut for holding hanging means of the construction site when the arms 11 are stopped at a desirable location, and is controlled to be opened for releasing them when the arms 11 are moved. Accordingly, under the condition that the entire movable platform is suspended at the construction site, the platform can travel beneath the hanging means.

Furthermore, since the driving force to the arms 11 is transmitted through the speed-reduction unit shown in FIGS. 6 and 7 without backlash, the platform does not receive any non-anticipated oscillation or shaking to startle the observation personnel on the personnel stage 2.

When the arms 11 are located at the desired position, the extendable and retractable legs 16 can be suitably extended under control of the control panel 5 in order to support the entire movable platform. For moving the arms 11, the legs 16 can be retracted so that the entire movable platform is supported by the rollers 6. While moving the arms 11, the rollers 6 support the entire movable platform and allow the platform to move smoothly. If necessary, the holders 14 can be equipped to the legs 16.

In the above-described movable platform, the arms 11 can be rotated about both ends of the connecting stage 1 in an angle range of about 120°. In addition, the arms 11 can slide straight on both ends of the connecting stage 1, from one end of the arms 11 which have holders 14, to another end of the arms 11 which also have holders 14. Therefore, the platform can be used for most construction situations.

Figure 5:
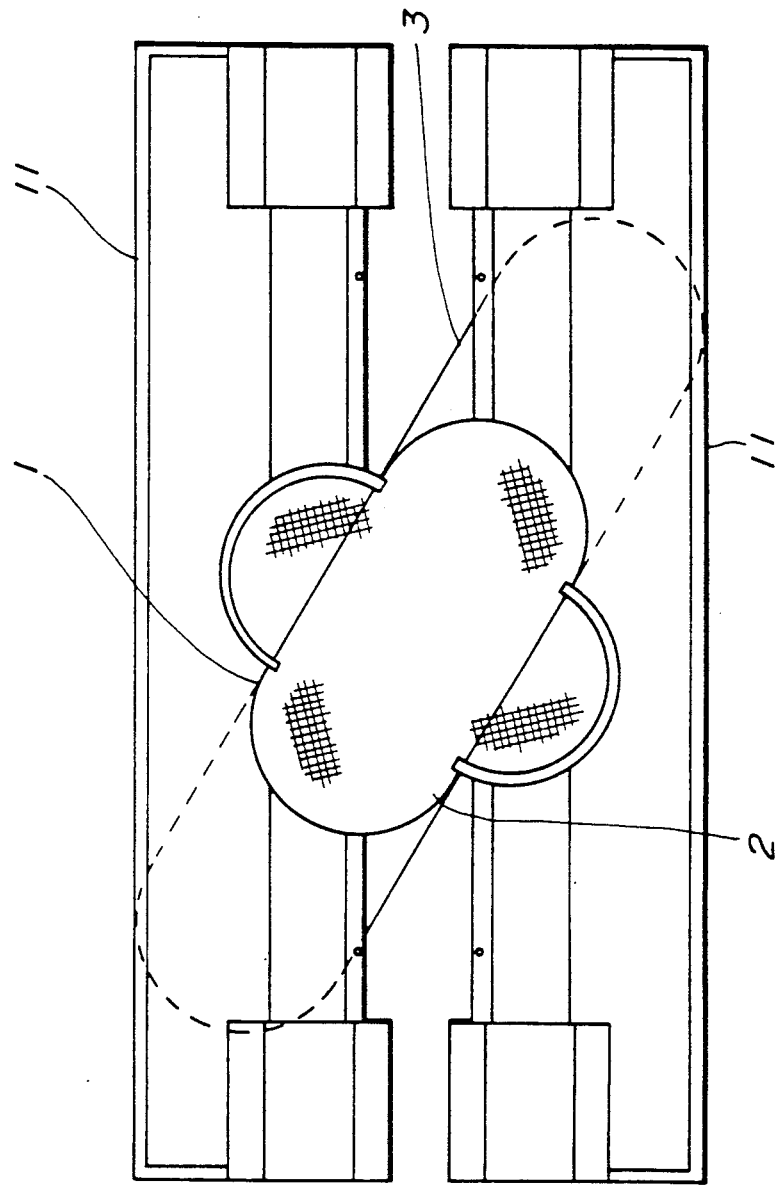
FIG. 5 is a plan view showing the movable platform when the platform is compacted.

Furthermore, when the observation is completed, the platform can be configured as shown in FIG. 5 so that a large storage space is unnecessary. Since the construction of the platform is not complicated, the platform may be provided at a low cost.

While the holders 14 are similar to a vise, holders utilizing electromagnetic force or suction-cup holders utilizing pneumatic force can be used. It is possible that the vise-type holders include the electromagnetic means or suction-cup means utilizing pneumatic force for more certain grip force of the holders. In the structure, when the holders grip the hanging means of the structure, the electromagnetic or suction-cup means is activated.

The driving mechanisms for the arms 11 are not limited to the rack 13 and the pinion 32 mechanism nor to the circular plate 33 and the accessory mechanism. Instead of these mechanisms, for example, a timing belt, wire, pneumatic means, or oil pressure means can be used.

While the control panel 5 for driving the arms 11 and holders 14 is installed in the personnel stage 2 in the above embodiment, the arms 11 can be controlled by another control means disposed elsewhere.

What is claimed is:
1. A movable platform for attachment to a structure having a hanging means, comprising:
   (a) a stage having two opposite end portions, and a horizontal surface for conveying objects thereon;
   (b) a pair of elongated, horizontal arms having two opposite end portions;
   (c) a plurality of upwardly extending holding means installed on said pair of arms for releasably hanging the platform from said hanging means of the structure;
   (d) driving means for movably coupling the pair of arms, respectively, to said end portions of the stage to slide and rotate the elongated arms with respect to the stage so as to be respectively rotatable at said end portions of the stage in a horizontal plane and slidable with respect to the stage in the direction of elongation of said arms;
   (e) a control means to actuate said driving means for selectively sliding and rotting the arms with respect to said stage, and for selectively actuating and releasing the holding means, so that the platform can be configured relative to the hanging means, and the stage can be conveyed with respect to the structure after at least one of said arms is attached to said hanging means, by actuating said driving means; and
   (f) speed-reduction units, said driving means being connected to said arms via said speed-reduction units, wherein each of said speed-reduction units comprises a globoid worm and a wheel, said globoid worm being connected to said driving means, said worm including a helical groove having a constant pitch, said wheel being connected to said arm means and held in engagement with said worm, said wheel including:
   a circular plate having an outer peripheral surface and an axis perpendicular to said axis of said worm, said circular plate having a plurality of recesses evenly disposed on the outer peripheral surface at a pitch identical to an integer multiple of said pitch of said helical groove of said worm; and a plurality of roller units respectively provided to said recesses, each of said roller units having a roller-support installed to said recess so as to be extendable radially outwardly and a pair of rollers rotatably attached to said roller-support, said rollers having a common axis perpendicular to said axis of said wheel, whereby said rollers being fitted in the groove of said worm without backlash while transmitting a rotational movement of the globoid worm to the wheel.

2. A movable platform according to claim 1, further comprising a plurality of legs extending downward from said arms, the legs being extendable under the control of said control means and capable of supporting said arms.

3. A movable platform according to claim 1, wherein said control means actuates said driving means so that movement of one arm is independent of movement of the other arm, and sliding movement of each arm is independent of rotational movement thereof.

* * * * *